UNITED STATES PATENT OFFICE.

ALFRED FRANCIS BILDERBECK GOMESS, OF LONDON, ENGLAND.

PROCESS OF TREATING TEXTILE VEGETABLE FIBERS.

SPECIFICATION forming part of Letters Patent No. 548,121, dated October 15, 1895.

Application filed January 25, 1894. Serial No. 498,013. (No specimens.)

*To all whom it may concern:*

Be it known that I, ALFRED FRANCIS BILDERBECK GOMESS, a subject of the Queen of Great Britain, residing at 24 Alfred Place, West South Kensington, London, England, have invented a certain new and Improved Process of Treating Textile Vegetable Fibers; and I do hereby declare that the following is a full, clear, and exact description of the invention, which will enable others skilled in the art to which it appertains to make and use the same.

My invention relates to an improved process for the preparation of textile vegetable fibers.

The process hereinafter described is more particularly applicable to vegetable fibers of the *Urtica* or nettle family; but it is also applicable to the preparation of the vegetable fibers from the cortex of other plants.

The processes consist in a series of operations whereby the cortex of the plants having been removed by any well-known process the lime is removed from the cortex, which is then deprived of its epidermis. The fibers are then separated from the cementitious matter that surrounds them, and are ultimately obtained in a condition ready for manufacturing purposes.

My first object is to remove the lime in the cortex, which exists in the form of calcium oxalate, calcium pectate, and other compounds of lime.

Hitherto the lime has been removed by the use of mineral acids. This is objectionable because the mineral acids tend to damage the quality of the fiber.

According to my invention I eliminate the lime by soaking the cortex in a cold solution of thio-sulphate or sulphite of soda. The quantity of thio-sulphate or sulphite of soda required varies with the amount of lime in the cortex; but I find that twelve parts, by weight, of thio-sulphate to one hundred parts, by weight, of the cortex is generally sufficient, with, of course, the necessary quantity of water. There must be sufficient thio-sulphate left (after rendering the lime soluble by conversion of it into a soluble thio-sulphate of lime) to deoxidize the epidermis of the cortex, which makes the epidermis soluble and easily removable in the subsequent treatment. When the quantity of thio-sulphate or sulphite of soda is sufficient to remove the lime and to deoxidize, the epidermis is more or less bleached, which is sufficient indication that enough thio-sulphate has been used. If the quantity of thio-sulphate is not sufficient to bleach, more must be added. After the treatment with thio-sulphate of soda I thoroughly wash in cold water, which removes the lime in the form of soluble thio-sulphate of lime. It is easy to determine the efficiency of the washing by testing it for thio-sulphate of lime in the water by any of the well-known ways; but there is practically no difficulty in knowing when the washing is sufficiently performed and the thio-sulphate of lime completely removed.

The next process is to remove the epidermis and also the cementitious matter, which latter lies outside of and between the fibers of the cellulose. The epidermis has been rendered more soluble by the deoxidation described. To do this, I boil in a solution of caustic soda, to which I add powdered zinc in such quantity that the alkalies shall always be greatly in excess of the zinc, so that the oxide of zinc formed will remain in solution. I am aware that caustic soda and other alkalies have been used for this purpose, but not with powdered zinc. Moreover, I use the caustic soda and powdered zinc subsequently to the above-described deoxidation and elimination of lime. This use of zinc-dust or powdered zinc is advantageous, because of the evolution of nascent hydrogen, which prevents any oxidation taking place, and the double oxide formed—that is, $ZnONa_2O$ or $Na_2ZnO_2$—dissolves the epidermis more readily than the alkali alone, besides dissolving a greater portion of cementitious matter. The effect of this boiling is to remove nearly completely the epidermis and cementitious matter. I then wash well with hot water two or three times, and then give the last washing, which should be with cold water.

It is still necessary to remove substances allied to cellulose and any parts of the epidermis not having been previously removed. To do this, I soak it in a solution of hypochlorite of an alkali and hydrochloric acid in such proportions that hypochlorous acid and not chlorine is formed, according to the equation:

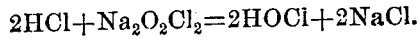

The solution must not be too strong or the cellulose will be attacked and damaged. I now again wash several times with cold water and then pass the fiber through a weak solution of ammonia. This rids the fiber of the traces of chlorine which are formed in the previous operations. I then again wash the fiber in warm or cold water, and finally boil the fiber with soap to cleanse it in the usual manner.

I am aware that thio-sulphate of sodium has been employed in the treatment of vegetable fibers, but in a hot state.

The thio-sulphate, if used hot in the herein-described process, would soon decompose with evolution of sulphurous acid and precipitation of sulphur. This is objectionable for the following reasons: As it has subsequently to enter a hot bath, the acid would tend to weaken the fiber, and the precipitation of sulphur would lead to the formation (if not thoroughly washed out, which is difficult to accomplish, being in the form of a precipitate) of sulphide of the base in the subsequent operation, and this is not advisable. Besides, the object of the thio-sulphate, as well as the sulphide of sodium, being used in the cold state is for the removal of lime by double decomposition and deoxidation only of the epidermis. If used in the hot state the fibrous material would be wholly or partially destroyed, and, as its object, as aforesaid, is to be confined to the epidermis only, the cold solution is absolutely necessary and is the main feature of my invention.

Having thus described my invention, what I claim, and desire to secure by Letters Patent of the United States, is—

1. The process of treating fibrous vegetable material, which consists in soaking the fibrous material in a cold solution of thio-sulphate of soda, in then washing the fibrous material with cold water, in then boiling the fibrous material in a solution of caustic soda containing metallic zinc, in washing well the treated material, in then soaking it in a solution of an alkaline hypochlorite and hydrochloric acid, in then washing the material thoroughly, then treating it with a weak solution of ammonia, and in finally boiling the fiber with soap, substantially as described.

2. The process of treating fibrous vegetable material which consists in dissolving the lime out of the fibrous material, in then boiling the fibrous material in a solution of caustic soda containing metallic zinc, in washing well the treated material, in then soaking it in a solution of an alkaline hypochlorite and hydrochloric acid, in then washing the material thoroughly, then treating it with a weak solution of ammonia, and in finally boiling the fiber with soap, substantially as described.

3. The process of treating fibrous vegetable material, which consists in soaking the fibrous material in a cold solution of thio-sulphate of soda, in then washing the fibrous material with cold water, in then boiling the fibrous material in a solution of caustic soda containing metallic zinc, in washing well the treated material in then soaking it in a solution of an alkaline hypochlorite and hydrochloric acid, and in then washing the material thoroughly, substantially as and for the purposes described.

4. The process of treating fibrous vegetable material, which consists in dissolving the lime out of the material, in boiling the material in a solution of caustic soda containing metallic zinc, and in further washing and cleansing the material in any well known way, substantially as and for the purposes described.

ALFRED FRANCIS BILDERBECK GOMESS.

Witnesses:
A. E. VIDAL,
A. BONNETT.